United States Patent
Taniuchi et al.

(10) Patent No.: US 9,130,228 B2
(45) Date of Patent: *Sep. 8, 2015

(54) LITHIUM ION OXYGEN BATTERY

(75) Inventors: Takuya Taniuchi, Saitama (JP); Kiyoshi Tanaami, Saitama (JP); Hiroshi Sakai, Saitama (JP); Mao Hori, Saitama (JP); Yuji Isogai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/111,586

(22) PCT Filed: Apr. 18, 2012

(86) PCT No.: PCT/JP2012/060495
§ 371 (c)(1),
(2), (4) Date: Oct. 14, 2013

(87) PCT Pub. No.: WO2012/144533
PCT Pub. Date: Oct. 26, 2012

(65) Prior Publication Data
US 2014/0045082 A1 Feb. 13, 2014

(30) Foreign Application Priority Data
Apr. 19, 2011 (JP) ................................ 2011-092960

(51) Int. Cl.
*H01M 4/505* (2010.01)
*H01M 12/08* (2006.01)
(Continued)

(52) U.S. Cl.
CPC ........... *H01M 4/505* (2013.01); *C01G 45/1264* (2013.01); *H01M 4/0459* (2013.01);
(Continued)

(58) Field of Classification Search
CPC ... H01M 4/0459; H01M 4/131; H01M 4/505; H01M 4/587; H01M 4/9016; H01M 4/50; H01M 12/06; H01M 12/065; H01M 12/08; C01G 45/1264
See application file for complete search history.

(56) References Cited

U.S. PATENT DOCUMENTS 8,697,297 B2 *   4/2014   Tanaami et al. ............... 429/406
8,835,061 B2 *   9/2014   Nakada et al. ................ 429/405
(Continued)

FOREIGN PATENT DOCUMENTS

JP          05-251087 A         9/1993
JP          07-249414 A         9/1995
(Continued)

OTHER PUBLICATIONS

Remsen et al., "Synthesis and Oxygen Storage Capacities of Hexagonal Dy1−xYxMnO3+δ," Chemistry of Materials, Published Aug. 16, 2011, 23, 3818-3827.*

(Continued)

*Primary Examiner* — Ula C Ruddock
*Assistant Examiner* — Amanda Barrow
(74) *Attorney, Agent, or Firm* — Carrier Blackman & Associates, P.C.; Joseph P. Carrier; William D. Blackman (57) ABSTRACT

A lithium ion oxygen battery capable of achieving a high energy density without being decreased in performance due to moisture or carbon dioxide in the atmosphere is provided. A lithium ion oxygen battery 1 comprises a positive electrode 2 containing oxygen as an active material and a lithium source, a negative electrode 3 made of a material capable of occluding or releasing lithium ions, and an electrolyte layer 4 sandwiched between the positive electrode 2 and the negative electrode 3 and capable of conducting the lithium ions. The positive electrode 2, the negative electrode 3, and the electrolyte layer 4 are housed in a hermetic case 5. The positive electrode 2 comprises an oxygen storage material and a lithium compound (excluding a combined metal oxide of lithium and another metal) as the lithium source.

4 Claims, 6 Drawing Sheets

(51) Int. Cl.
*H01M 12/06* (2006.01)
*H01M 4/131* (2010.01)
*H01M 4/04* (2006.01)
*H01M 4/587* (2010.01)
*H01M 4/90* (2006.01)
*H01M 4/50* (2010.01)
*C01G 45/12* (2006.01)

(52) U.S. Cl.
CPC ............... *H01M4/131* (2013.01); *H01M 4/50* (2013.01); *H01M 4/587* (2013.01); *H01M 4/9016* (2013.01); *H01M 12/06* (2013.01); *H01M 12/065* (2013.01); *H01M 12/08* (2013.01); *Y02E 60/50* (2013.01)

(56) References Cited

U.S. PATENT DOCUMENTS

| | | | | |
|---|---|---|---|---|
| 8,940,447 | B2* | 1/2015 | Tanaami et al. | 429/405 |
| 8,993,180 | B2* | 3/2015 | Tanaami et al. | 429/405 |
| 2009/0202412 | A1* | 8/2009 | Isogai et al. | 423/263 |
| 2011/0195320 | A1* | 8/2011 | Nishikoori et al. | 429/403 |
| 2012/0118149 | A1* | 5/2012 | Dabrowski et al. | 95/54 |
| 2012/0141884 | A1* | 6/2012 | Takahata | 429/332 |
| 2013/0164638 | A1* | 6/2013 | Tanaami et al. | 429/406 |

FOREIGN PATENT DOCUMENTS

| | | | | |
|---|---|---|---|---|
| JP | 2001-273935 | * | 10/2001 | ............ H01M 12/08 |
| JP | 2005-166685 | * | 6/2005 | ............ H01M 12/08 |
| JP | 2005-166685 | A | 6/2005 | |
| JP | 2008-112724 | * | 5/2008 | .............. H01M 4/90 |
| JP | 2008-112724 | A | 5/2008 | |
| JP | 2009-207981 | A | 9/2009 | |
| JP | 2009-230985 | A | 10/2009 | |
| WO | WO 2010/082338 | * | 7/2010 | ............ H01M 12/08 |
| WO | 2010/131536 | A1 | 11/2010 | |
| WO | WO 2011/115176 | * | 9/2011 | ............ H01M 12/08 |
| WO | WO 2012/029743 | * | 3/2012 | ............ H01M 12/08 |

OTHER PUBLICATIONS

Ishii et al., "Electrode Materials for Lithium Ion Secondary Batteries", Proceedings of the School of Engineering of Tokai University, vol. 2000, pp. 65-70.

Extended European search report dated Jun. 20, 2014 issued in the counterpart EP Patent Application 12774482.9.

* cited by examiner

LITHIUM ION OXYGEN BATTERY

TECHNICAL FIELD

The present invention relates to a lithium ion oxygen battery.

BACKGROUND ART

Conventionally, a lithium ion battery which comprises a positive electrode containing lithium cobalt oxide ($LiCoO_2$) as an active material, a negative electrode containing graphite as an active material, and an electrolyte layer sandwiched between the positive electrode and the negative electrode and capable of conducting lithium ions is known (for example, refer to Non Patent Literature 1). Lithium ions are occluded or released (intercalation or deintercalation) by lithium cobalt oxide or graphite at the positive electrode or the negative electrode in association with charge and discharge so that the lithium ion battery functions as a battery.

However, because the lithium cobalt oxide becomes less able to maintain a crystalline structure when a lithium extraction amount is increased, usually available capacity of the lithium cobalt oxide is considered to be 120 to 140 mAh/g, although the theoretical capacity of the lithium cobalt oxide is 274 mAh/g. On the other hand, the graphite has capacity of 372 mAh/g, and has capacity approximately three times of the capacity considered usually available in the lithium cobalt oxide.

Accordingly, in the lithium ion battery, a mass of the positive electrode active material is needed to be approximately three times of a mass of the negative electrode active material when structuring the battery, and there is a problem in that an energy density per mass cannot be increased sufficiently.

In order to solve the above-described problem, a lithium ion oxygen battery which comprises a positive electrode containing oxygen as an active material and lithium oxide or lithium peroxide, a negative electrode containing graphite as an active material, and an electrolyte layer sandwiched between the positive electrode and the negative electrode and capable of conducting lithium ions has been proposed (for example, refer to Patent Literature 1). In the lithium ion oxygen battery, the positive electrode comprises an activated carbon fiber and is open to the atmosphere, and oxygen in the atmosphere is oxidized by the activated carbon fiber.

In the lithium ion oxygen battery, at the time of discharge, as shown in the following formula, metallic lithium occluded (intercalation) by the graphite is ionized to generate lithium ions and electrons at the negative electrode. The generated lithium ions are released (deintercalation) from the graphite and migrate through the electrolyte layer to the positive electrode.

On the other hand, oxygen taken up from the atmosphere receives electrons to become oxygen ions, and the oxygen ions react with the lithium ions to generate lithium oxide or lithium peroxide at the positive electrode. Electric energy can be extracted by connecting the negative electrode and the positive electrode with a conductive wire.

(negative electrode) $4Li \rightarrow 4Li^+ + 4e^-$
(positive electrode) $O_2 + 4e^- \rightarrow 2O^{2-}$
$4Li^+ + 2O^{2-} \rightarrow 2Li_2O$
$2Li^+ + 2O^{2-} \rightarrow Li_2O_2$ In addition, at the time of charge, as shown in the following formulas, lithium ions, electrons, and oxygen are generated from lithium oxide or lithium peroxide at the positive electrode, and the generated lithium ions permeate the electrolyte layer to be transferred to the negative electrode. The lithium ions receive the electrons to be precipitated on the negative electrode as metallic lithium. The precipitated metallic lithium is occluded (intercalation) by the graphite.

(positive electrode) $2Li_2O \rightarrow 4Li^+ + O_2 + 4e^-$
$Li_2O_2 \rightarrow 2Li^+ + O_2 + 4e^-$
(negative electrode) $4Li^+ + 4e^- \rightarrow 4Li$ According to the lithium ion oxygen battery, since the positive electrode uses oxygen in the atmosphere as an active material, the mass of the positive electrode active material is not subjected to the restriction, and an energy density per mass can be increased.

CITATION LIST

Patent Literature

Patent Literature 1: Japanese Patent Laid-Open No. 2005-166685

Non Patent Literature

Non Patent Literature 1: Soichiro Ishii, Keiichi Katayama, "Electrode Materials for Lithium Ion Secondary Batteries", Proceedings of the School of Engineering of Tokai University, Tokai University, 2000, pp. 65-70

SUMMARY OF INVENTION

Technical Problem

However, since the positive electrode is open to the atmosphere in the conventional lithium ion oxygen battery, there is a disadvantage that moisture or carbon dioxide contained in the atmosphere penetrates into the battery, thereby deteriorating respective components and decreasing performance.

It is an object of the present invention to provide a lithium ion oxygen battery capable of achieving a high energy density without being decreased in performance due to moisture or carbon dioxide in the atmosphere by solving such a disadvantage.

Solution to Problem

In order to achieve such an object, the present invention is characterized in that a lithium ion oxygen battery comprises a positive electrode containing oxygen as an active material and a lithium source, a negative electrode made of a material capable of occluding or releasing lithium ions, and an electrolyte layer sandwiched between the positive electrode and the negative electrode and capable of conducting the lithium ions, in which the positive electrode, the negative electrode, and the electrolyte layer are housed in a hermetic case, and the positive electrode comprises an oxygen storage material and a lithium compound (excluding a combined metal oxide of lithium and another metal) as the lithium source.

In the lithium ion oxygen battery of the present invention, since the positive electrode, the negative electrode, and the electrolyte layer are housed in the hermetic case, a decrease in performance due to penetration of moisture or carbon dioxide in the atmosphere into the battery can be prevented. Moreover, since the positive electrode contains the oxygen storage material and the lithium compound, at the time of charge, lithium ions can be generated from the lithium compound and oxygen generated by oxidation of oxygen ions can be stored in the oxygen storage material. On the other hand, at the time of discharge, the positive electrode can reduce oxygen removed from the oxygen storage material to generate oxygen ions, and lithium oxide or lithium peroxide can be generated from the oxygen ions and the lithium ions.

The oxygen storage material has a function of occluding or releasing oxygen, and at the same time, allows oxygen to be adsorbed on and desorbed from the surface thereof. When the oxygen storage material absorbs and releases oxygen, formation and cleavage of a chemical bond with oxygen occur. However, when oxygen is adsorbed on and desorbed from the surface of the oxygen storage material, only intermolecular force is involved, and formation and cleavage of a chemical bond do not occur.

Therefore, adsorption and desorption of oxygen with respect to the surface of the oxygen storage material are performed at lower energy compared to the case where the oxygen storage material absorbs and releases oxygen, and oxygen adsorbed on the surface of the oxygen storage material is preferentially used in a battery reaction. As a result, a decrease in a reaction rate and an increase in an overvoltage can be suppressed.

In the lithium ion oxygen battery of the present invention, it is preferable that the material capable of occluding or releasing lithium ions be made of a carbonaceous material. In the carbonaceous material, the lithium can be occluded between molecules at the time of charge, and the lithium occluded between the molecules can be released at the time of discharge.

Moreover, it is further preferable that the carbonaceous material be either graphite or hard carbon. In both the graphite and the hard carbon, the lithium can be occluded between layers at the time of charge, and the lithium occluded between the layers can be released at the time of discharge.

Furthermore, in the lithium ion oxygen battery of the present invention, it is preferable that the oxygen storage material be either a combined metal oxide containing Y and Mn or a combined metal oxide represented by a general formula $Mn_{2-(a+b+c)}Zr_aAg_bRu_cO_3$ (in the formula, $2>a+b+c>0$). Since the oxygen storage material is made of any of the combined metal oxides, the oxygen storage material comprises the function of occluding or releasing oxygen, can make oxygen be adsorbed on and desorbed from the surface thereof, and can act as a catalyst of a chemical reaction at the positive electrode.

DESCRIPTION OF EMBODIMENTS

Next, an embodiment of the present invention will be described in more detail with reference to attached drawings.

Figure 1:
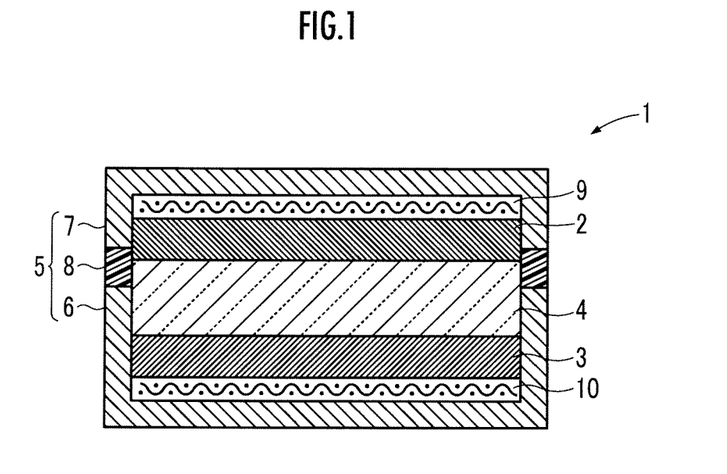
FIG. 1 is an explanatory cross-sectional diagram showing one configuration example of an oxygen battery of the present invention.

As shown in FIG. 1, a lithium ion oxygen battery 1 of the present embodiment comprises a positive electrode 2, a negative electrode 3, and an electrolyte layer 4 disposed between the positive electrode 2 and the negative electrode 3, and the positive electrode 2, the negative electrode 3, and the electrolyte layer 4 are hermetically housed in a case 5.

The case 5 comprises a cup-shaped case body 6 and a cover 7 configured to close the case body 6, and an insulation resin 8 is interposed between the case body 6 and the cover 7. The positive electrode 2 has a positive electrode current collector 9 provided between the positive electrode 2 and the top surface of the cover 7, and the negative electrode 3 has a negative electrode current collector 10 provided between the negative electrode 3 and the bottom surface of the case body 6.

In the lithium ion oxygen battery 1, the positive electrode 2 is made of an oxygen storage material, a conductive material, and a binding agent, and contains a lithium compound. The oxygen storage material has a function of occluding or releasing oxygen, and at the same time, can make oxygen be adsorbed on and desorbed from a surface thereof. In the case where the oxygen storage material absorbs and releases oxygen, formation and cleavage of a chemical bond with oxygen occur. However, in the case of making oxygen be adsorbed on and desorbed from the surface of the oxygen storage material, only intermolecular force acts, and formation and cleavage of a chemical bond do not occur.

Therefore, adsorption and desorption of oxygen with respect to the surface of the oxygen storage material are performed at lower energy compared to the case where the oxygen storage material absorbs and releases oxygen, and oxygen adsorbed on the surface of the oxygen storage material is preferentially used in a battery reaction. As a result, a decrease in a reaction rate and an increase in an overvoltage can be suppressed.

It is preferable that the oxygen storage material act as a catalyst of a chemical reaction at the positive electrode 2, in addition to having the function of occluding or releasing oxygen and capable of making oxygen be adsorbed on and desorbed from the surface thereof. Examples of such an oxygen storage material include either a combined metal oxide containing Y and Mn or a combined metal oxide represented by a general formula $Mn_{2-(a+b+c)}Zr_aAg_bRu_cO_3$ (in the formula, $2>a+b+c>0$).

Examples of the combined metal oxide containing Y and Mn include $YMnO_3$ or a compound in which a part of Y or Mn in $YMnO_3$ is substituted with another metal. The $YMnO_3$ may be reduction-treated and may contain another metal oxide such as $ZrO_2$.

Examples of the compound in which a part of Y or Mn in $YMnO_3$ is substituted with another metal include a compound represented by a general formula $Y_{1-x}Ag_xMn_{1-y}A_yO_3$ (in the formula, A represents Ru or Ti, $1>x>0$ and $1>y>0$). The compound represented by the general formula $Y_{1-x}Ag_xMn_{1-y}A_yO_3$ may be acid-treated and reduction-treated.

Examples of the conductive material include a carbonaceous material such as Ketjen Black and vapor grown carbon fiber (VGCF). Examples of the binding agent include polytetrafluoroethylene (PTFE), polyvinylidene fluoride (PVDF), and an acrylic resin.

The lithium compound may be anything except for a combined metal oxide of lithium and another metal, such as lithium cobalt oxide (LiCoO$_2$), and examples thereof include lithium peroxide (Li$_2$O$_2$) and lithium oxide (Li$_2$O).

Next, the negative electrode 3 is made of a material capable of occluding or releasing lithium ions, a binding agent, and a dispersing agent, and may further contain a conductive material or a viscosity modifier.

Examples of the material capable of occluding or releasing lithium ions include a carbonaceous material such as graphite or hard carbon. In the case of using graphite as the carbonaceous material, the graphite may be used by being mixed with another carbonaceous material such as vapor grown carbon fiber (VGCF) and carbon black.

Examples of the binding agent include polyvinylidene fluoride (PVDF), styrene-butadiene rubber (SBR) and an acrylic resin. Examples of the dispersing agent include N-methyl-2-pyrrolidone (NMP) and pure water.

Examples of the conductive material include a carbonaceous material such as Ketjen Black. Examples of the viscosity modifier include carboxymethylcellulose (CMC).

Next, the electrolyte layer 4 may be a material obtained by immersing a non-aqueous electrolyte solution in a separator, for example, and may be a molten salt or a solid electrolyte.

As the non-aqueous electrolyte solution, for example, a material obtained by dissolving a lithium salt in a non-aqueous solvent can be used. Examples of the lithium salt include lithium hexafluorophosphate (LiPF$_6$). Examples of the non-aqueous solvent include a carbonate ester solvent, an ether solvent, and an ionic liquid.

Examples of the carbonate ester solvent include ethylene carbonate, propylene carbonate, dimethyl carbonate, and diethyl carbonate. The carbonate ester solvent can be used by mixing two or more kinds thereof.

Examples of the ether solvent include dimethoxyethane, dimethyl triglyme, and polyethyleneglycol. The ether solvent can be used by mixing two or more kinds thereof.

Examples of the ionic liquid include a salt of a cation such as imidazolium, ammonium, pyridinium, and piperidinium, and an anion such as bis(trifluoromethylsulfonyl)imide (TTSI), bis(pentafluoroethylsulfonyl)imide (BETI), tetrafluoroborate, perchlorate, and a halogen anion.

Examples of the separator include glass fiber, glass paper, polypropylene non-woven fabric, polyimide non-woven fabric, polyphenylene sulfide non-woven fabric, and a polyethylene porous film.

Examples of the solid electrolyte include an oxide solid electrolyte and a sulfide solid electrolyte.

Examples of the oxide solid electrolyte include Li$_7$La$_3$Zr$_2$O$_{12}$ which is a combined metal oxide of lithium, lanthanum, and zirconium, and glass ceramics composed mostly of lithium, aluminum, silicon, titanium, germanium, and phosphorus. In the Li$_7$La$_3$Zr$_2$O$_{12}$, a part of lithium, lanthanum, and zirconium may be respectively substituted with another metal such as strontium, barium, silver, yttrium, bismuth, lead, tin, antimony, hafnium, tantalum, and niobium.

Next, examples of the positive electrode current collector 9 include a mesh or a porous body made of titanium, stainless steel, nickel, aluminum and the like. Examples of the negative electrode current collector 10 include metal foil or a porous body made of copper, titanium, stainless steel and the like, with which lithium is not alloyed.

In the lithium ion oxygen battery 1 of the present embodiment, at the time of charge, as shown in the following formulas, lithium ions and oxygen ions are generated from lithium peroxide or lithium oxide as the lithium compound at the positive electrode 2. The lithium ions migrate through the electrolyte layer 4 to the negative electrode 3, and the oxygen ions are occluded by the oxygen storage material by formation of a chemical bond or stored by being adsorbed on the surface of the oxygen storage material.

On the other hand, at the negative electrode 3, the lithium ions which have migrated from the positive electrode 2 receive electrons to generate metallic lithium, and the generated metallic lithium is occluded (intercalation) by the carbonaceous material.

(positive electrode) Li$_2$O→2Li$^+$+O$^{2-}$ (negative electrode) Li$^+$+e$^-$→Li In addition, at the time of discharge, as shown in the following formula, the metallic lithium is ionized to generate lithium ions and electrons at the negative electrode 3. The generated lithium ions are released (deintercalation) from the carbonaceous material to be transferred to the positive electrode 2 through the electrolyte layer 4. On the other hand, at the positive electrode 2, oxygen released from the oxygen storage material by cleavage of the chemical bond or liberated by desorption from the surface thereof receives electrons together with the lithium ions which have migrated from the negative electrode 3 to generate lithium peroxide or lithium oxide. Electric energy can be extracted by connecting the negative electrode 3 and the positive electrode 2 with a conductive wire (not shown in the drawing).

(negative electrode) Li→Li$^+$+e$^-$
(positive electrode) 4Li$^+$+O$_2$+4e$^-$→2Li$_2$O Next, Examples and Comparative Examples will be described.

EXAMPLES

Example 1

In the present Example, firstly, yttrium nitrate pentahydrate, manganese nitrate hexahydrate, and malic acid were pulverized and mixed at a molar ratio of 1:1:6 to obtain a material mixture for a combined metal oxide. Next, the obtained material mixture for a combined metal oxide was reacted at a temperature of 250° C. for 30 minutes, and furthermore, at a temperature of 300° C. for 30 minutes and at a temperature of 350° C. for 1 hour. Then, after pulverizing and mixing a mixture of a reaction product, the mixture was calcined at a temperature of 1000° C. for 1 hour to obtain a combined metal oxide represented by a chemical formula YMnO$_3$.

Next, 40 parts by mass of the obtained YMnO$_3$, 50 parts by mass of Ketjen Black (manufactured by Lion Corporation) as a conductive material, 10 parts by mass of polytetrafluoroethylene (manufactured by Daikin Industries, Ltd.) as a binding agent, and furthermore 80 parts by mass of lithium peroxide (manufactured by Kojundo Chemical Laboratory Co., Ltd.) as a lithium compound were mixed. The obtained mixture was pressure bonded to the positive electrode current collector 9 made of a titanium mesh at a pressure of 10 MPa to form the positive electrode 2 having a diameter of 15 mm and a thickness of 1 mm.

Next, 90 parts by mass of graphite (manufactured by TIMCAL Graphite & Carbon) as a carbon material and 10 parts by mass of polyvinylidene fluoride (manufactured by Kureha Corporation) as a binding agent were dispersed in 125 parts by mass of N-methyl-2-pyrrolidone to be mixed. The obtained mixture was applied to copper foil having a thickness of 12.5 µm by an applicator, and dried, and then, punched out by a press to form the negative electrode 3 having a diameter of 15 mm and a thickness of 50 μm. The negative electrode 3 comprises the copper foil as the negative electrode current collector 10.

Next, the negative electrode current collector 10 and the negative electrode 3 were arranged inside the case body 6 made of SUS, which has a bottom and a cylindrical shape with an inner diameter of 15 mm, such that the negative electrode current collector 10 is in contact with the bottom surface of the case body 6.

Next, a separator made of non-woven fabric having a diameter of 15 mm (manufactured by Tapyrus Co., Ltd.) was stacked on the negative electrode 3. Next, the positive electrode 2 and the positive electrode current collector 9 obtained as described above were stacked on the separator such that the positive electrode 2 is in contact with the separator. In the present Example, the mass of lithium peroxide in the positive electrode 2 was set to be double of the mass of graphite in the negative electrode 3.

Next, a non-aqueous electrolyte solution was poured into the separator to form the electrolyte layer 4. As the non-aqueous electrolyte solution, a solution obtained by dissolving lithium hexafluorophosphate ($LiPF_6$) as a supporting salt in a mixed solution in which 30 parts by mass of ethylene carbonate and 70 parts by mass of diethyl carbonate are mixed at a concentration of 1 mol/L (manufactured by Kishida Chemical Co., Ltd.) was used.

Next, a laminate composed of the negative electrode current collector 10, the negative electrode 3, the electrolyte layer 4, the positive electrode 2, and the positive electrode current collector 9 and housed in the case body 6 was closed by the cover 7 made of SUS, which has a bottom and a cylindrical shape with an inner diameter of 15 mm. At this time, by arranging the ring-shaped insulation resin 8 having an outer diameter of 70 mm, an inner diameter of 40 mm, and a thickness of 0.3 mm and made of polytetrafluoroethylene between the case body 6 and the cover 7, the lithium ion oxygen battery 1 shown in FIG. 1 was obtained. As shown, a top surface of the positive electrode current collector 9 is directly adjacent and in direct physical contact with a top wall of the hermetic case, a bottom surface of the negative electrode current collector 10 is directly adjacent and in direct physical contact with a bottom wall of the hermetic case, and circumferential faces of the positive electrode current collector, the positive electrode, the electrolyte layer, the negative electrode, and the negative electrode current collector are directly adjacent and in direct physical contact with inner circumferential walls of the case, such that the interior of the case 5 is substantially fully occupied by the positive and negative electrodes 2, 3, the electrolyte layer 4 including the separator, and the positive and negative electrode current collectors 9, 10.

Figure 2:
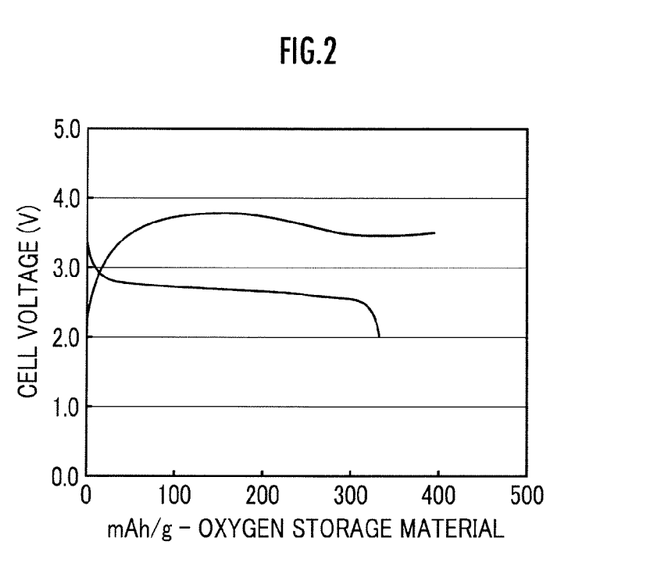
FIG. 2 is a graph showing charging and discharging curves in a lithium ion oxygen battery of Example 1.

Next, the lithium ion oxygen battery 1 obtained in the present Example was connected to an electrochemical measuring device (manufactured by Toho Technical Research Co., Ltd.), and a current of 0.1 mA (0.078 mA) per 1 $cm^2$ of the negative electrode 3 was applied between the negative electrode 3 and the positive electrode 2 to be charged for 50 hours, and then, discharge was performed until a cell voltage reached 2 V. A relationship between the cell voltage and discharge capacity at this time is shown in FIG. 2.

Moreover, since the laminate composed of the negative electrode current collector 10, the negative electrode 3, the electrolyte layer 4, the positive electrode 2, and the positive electrode current collector 9 is hermetically sealed in the case 5 composed of the case body 6, the cover 7, and the insulation resin 8 in the lithium ion oxygen battery 1 obtained in the present Example, battery performance was not decreased due to moisture or carbon dioxide in the atmosphere.

Comparative Example 1

In the present Comparative Example, lithium cobalt oxide ($LiCoO_2$, manufactured by Nippon Chemical Industrial Co., Ltd.) was used in place of $YMnO_3$ and lithium peroxide was not used at all, and firstly, 40 parts by mass of $LiCoO_2$, 50 parts by mass of Ketjen Black (manufactured by Lion Corporation) as a conductive material, and 10 parts by mass of polytetrafluoroethylene (manufactured by Daikin Industries, Ltd.) as a binding agent were mixed. The obtained mixture was pressure bonded to the positive electrode current collector 9 made of a titanium mesh at a pressure of 10 MPa to form the positive electrode 2 having a diameter of 15 mm and a thickness of 1 mm.

Next, a lithium ion battery was produced in the same manner as in Example 1, except that the positive electrode 2 obtained in the present Comparative Example was used.

Next, the lithium ion battery obtained in the present Comparative Example was connected to an electrochemical measuring device (manufactured by Toho Technical Research Co., Ltd.), and a current of 0.1 mA (0.078 mA) per 1 $cm^2$ of the negative electrode 3 was applied between the negative electrode 3 and the positive electrode 2 to be charged for 20 hours, and then, discharge was performed until a cell voltage reached 2.5 V. A relationship between the cell voltage and discharge capacity at this time is shown in FIG. 3.

Figure 3:
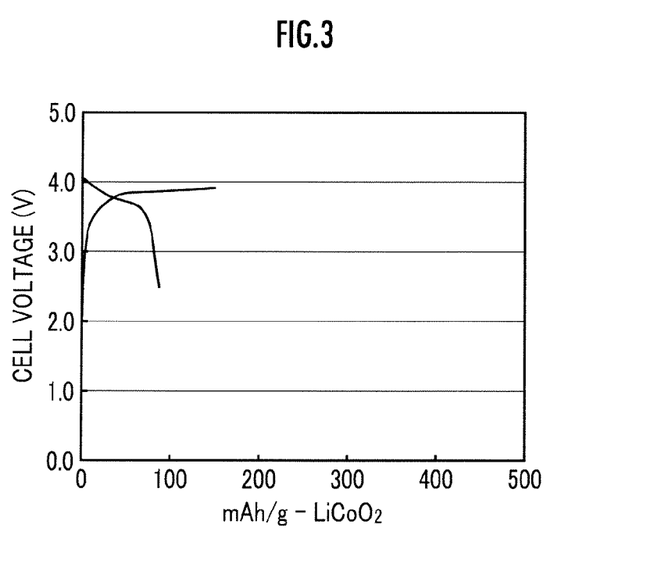
FIG. 3 is a graph showing charging and discharging curves in a lithium ion battery of Comparative Example 1.

As shown in FIG. 2 and FIG. 3, the lithium ion oxygen battery 1 of Example 1, in which the combined metal oxide represented by the chemical formula $YMnO_3$ and lithium peroxide are contained in the positive electrode 2, can obtain approximately four times of capacity compared to the lithium ion battery of Comparative Example 1, in which the combined metal oxide and lithium peroxide are not contained at all in the positive electrode 2. Therefore, it is clear that, according to the lithium ion oxygen battery 1 of Example 1, a high energy density can be achieved.

Example 2

In the present Example, firstly, the combined metal oxide represented by the chemical formula $YMnO_3$ was obtained in the same manner as in Example 1. Next, the obtained $YMnO_3$ was reduction-treated at a temperature of 300° C.

Next, 80 parts by mass of the reduction-treated $YMnO_3$, 8 parts by mass of Ketjen Black (manufactured by Lion Corporation) as a conductive material, 2 parts by mass of vapor grown carbon fiber (VGCF, manufactured by Showa Denko K.K.) as a conductive material, 10 parts by mass of polyvinylidene fluoride (manufactured by Kureha Corporation) as a binding agent, and 80 parts by mass of lithium peroxide (manufactured by Kojundo Chemical Laboratory Co., Ltd.) as a lithium compound were dispersed in 600 parts by mass of N-methyl-2-pyrrolidone to be mixed. The obtained mixture was applied to the positive electrode current collector 9 made of an aluminum mesh (manufactured by Clever Co., Ltd.) and dried to form the positive electrode 2 having a diameter of 15 mm and a thickness of 0.5 mm.

Next, 90 parts by mass of hard carbon (manufactured by Kureha Corporation) as a carbon material, 2 parts by mass of Ketjen Black (manufactured by Lion Corporation) as a conductive material, and 8 parts by mass of polyvinylidene fluoride (manufactured by Kureha Corporation) as a binding agent were dispersed in 150 parts by mass of N-methyl-2-pyrrolidone to be mixed. The obtained mixture was applied to a nickel porous body (manufactured by Sumitomo Electric Toyama Co., Ltd., trade name: CELMET) having a thickness of 400 μm, and dried, and then, punched out by a press to form the negative electrode 3 having a diameter of 15 mm and a thickness of 300 μm. The negative electrode 3 has the nickel porous body as the negative electrode current collector 10.

Next, the lithium ion oxygen battery 1 shown in FIG. 1 was obtained in the same manner as in Example 1, except that the positive electrode 2 and the negative electrode 3 obtained in the present Example were used.

Figure 4:
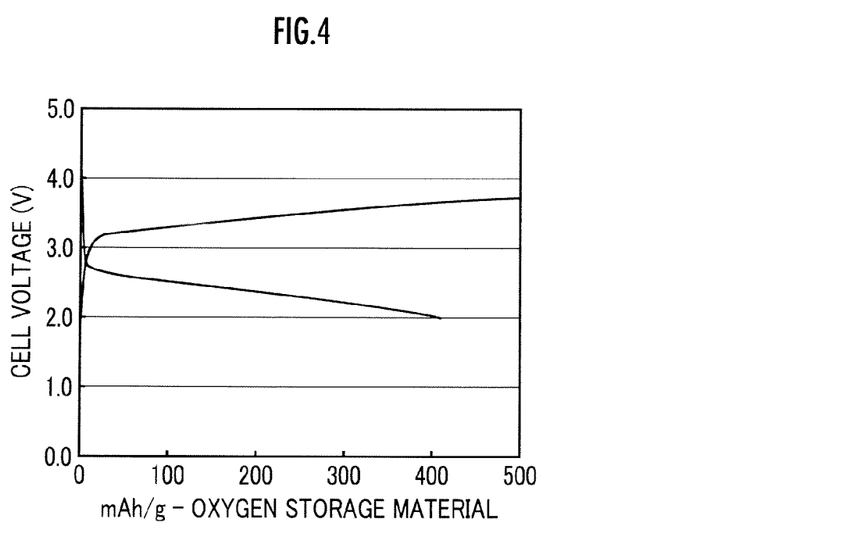
FIG. 4 is a graph showing charging and discharging curves in a lithium ion oxygen battery of Example 2.

Next, the lithium ion oxygen battery 1 obtained in the present Example was connected to an electrochemical measuring device (manufactured by Toho Technical Research Co., Ltd.), and a current of 0.0125 mA (0.022 mA) per 1 cm$^2$ of the negative electrode 3 was applied between the negative electrode 3 and the positive electrode 2 to be charged for 85 hours, and then, discharge was performed with a current of 0.025 mA (0.044 mA) per 1 cm$^2$ of the negative electrode 3 until a cell voltage reached 2 V. A relationship between the cell voltage and discharge capacity at this time is shown in FIG. 4.

Comparative Example 2

In the present Comparative Example, lithium cobalt oxide ($LiCoO_2$, manufactured by Nippon Chemical Industrial Co., Ltd.) was used in place of the reduction-treated $YMnO_3$ and lithium peroxide was not used at all, and firstly, 80 parts by mass of $LiCoO_2$, 8 parts by mass of Ketjen Black (manufactured by Lion Corporation) as a conductive material, and 12 parts by mass of polyvinylidene fluoride (manufactured by Kureha Corporation) as a binding agent were dispersed in 150 parts by mass of N-methyl-2-pyrrolidone to be mixed. The obtained mixture was applied to the positive electrode current collector 9 made of aluminum and dried to form the positive electrode 2 having a diameter of 15 mm and a thickness of 0.5 mm.

Next, a lithium ion battery was produced in the same manner as in Example 2, except that the positive electrode 2 obtained in the present Comparative Example was used.

Next, the lithium ion battery obtained in the present Comparative Example was connected to an electrochemical measuring device (manufactured by Toho Technical Research Co., Ltd.), and a current of 0.0125 mA (0.022 mA) per 1 cm$^2$ of the negative electrode 3 was applied between the negative electrode 3 and the positive electrode 2 to be charged for 140 hours, and then, discharge was performed with a current of 0.025 mA (0.044 mA) per 1 cm$^2$ of the negative electrode 3 until a cell voltage reached 2 V. A relationship between the cell voltage and discharge capacity at this time is shown in FIG. 5.

Figure 5:
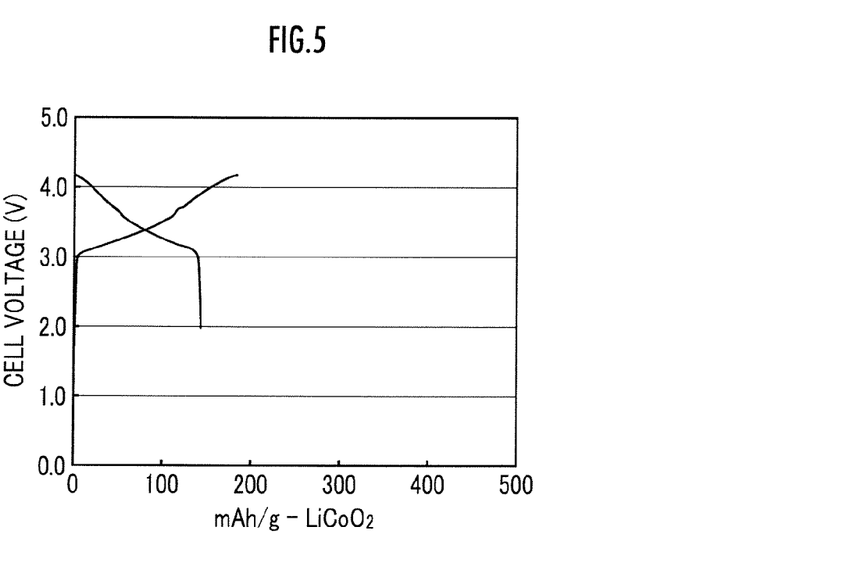
FIG. 5 is a graph showing charging and discharging curves in a lithium ion battery of Comparative Example 2.

As shown in FIG. 4 and FIG. 5, the lithium ion oxygen battery 1 of Example 2, in which the reduction-treated combined metal oxide represented by the chemical formula $YMnO_3$ and lithium peroxide are contained in the positive electrode 2, can obtain approximately three times of capacity compared to the lithium ion battery of Comparative Example 2, in which the reduction-treated combined metal oxide and lithium peroxide are not contained at all in the positive electrode 2. Therefore, it is clear that, according to the lithium ion oxygen battery 1 of Example 2, a high energy density can be achieved.

Example 3

In the present Example, firstly, the combined metal oxide represented by the chemical formula $YMnO_3$ was obtained in the same manner as in Example 1. Next, the obtained $YMnO_3$ was reduction-treated at a temperature of 300° C.

Next, 40 parts by mass of the reduction-treated $YMnO_3$, 30 parts by mass of Ketjen Black (manufactured by Lion Corporation) as a conductive material, 30 parts by mass of an acrylic resin (manufactured by Zeon Corporation) as a binding agent, and 40 parts by mass of lithium peroxide (manufactured by Kojundo Chemical Laboratory Co., Ltd.) as a lithium compound were dispersed in 500 parts by mass of N-methyl-2-pyrrolidone to be mixed. The obtained mixture was applied to the positive electrode current collector 9 made of an aluminum mesh (manufactured by Clever Co., Ltd.) and dried to form the positive electrode 2 having a diameter of 15 mm and a thickness of 0.5 mm.

Next, 90 parts by mass of graphite (manufactured by Kureha Corporation) as a carbon material, 2 parts by mass of Ketjen Black (manufactured by Lion Corporation) as a conductive material, and 8 parts by mass of polyvinylidene fluoride (manufactured by Kureha Corporation) as a binding agent were dispersed in 100 parts by mass of N-methyl-2-pyrrolidone to be mixed. The obtained mixture was applied to a nickel porous body (manufactured by Sumitomo Electric Toyama Co., Ltd., trade name: CELMET) having a thickness of 400 μm, and dried, and then, punched out by a press to form the negative electrode 3 having a diameter of 15 mm and a thickness of 350 μm. The negative electrode 3 has the nickel porous body as the negative electrode current collector 10.

Next, the lithium ion oxygen battery 1 shown in FIG. 1 was obtained in the same manner as in Example 1, except that the positive electrode 2 and the negative electrode 3 obtained in the present Example were used.

Figure 6:
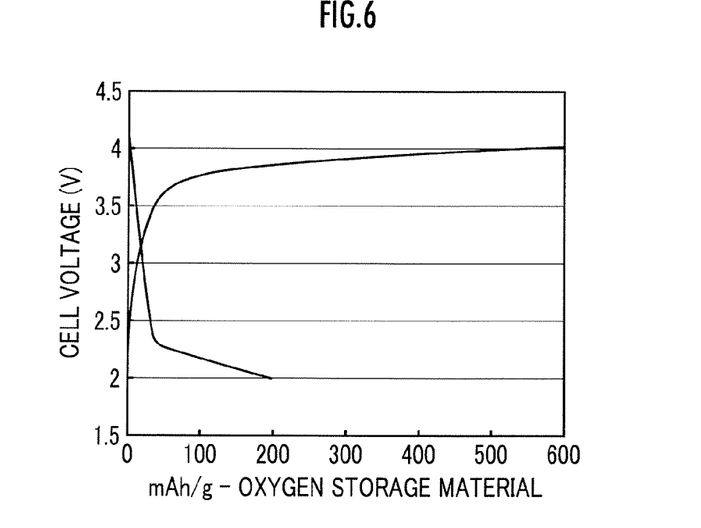
FIG. 6 is a graph showing charging and discharging curves in a lithium ion oxygen battery of Example 3.

Next, the lithium ion oxygen battery 1 obtained in the present Example was connected to an electrochemical measuring device (manufactured by Toho Technical Research Co., Ltd.), and a current of 0.0125 mA (0.022 mA) per 1 cm$^2$ of the negative electrode 3 was applied between the negative electrode 3 and the positive electrode 2 to be charged to 4.2 V, and then, discharge was performed with a current of 0.025 mA (0.044 mA) per 1 cm$^2$ of the negative electrode 3 until a cell voltage reached 2 V. A relationship between the cell voltage and discharge capacity at this time is shown in FIG. 6.

Example 4

In the present Example, firstly, yttrium nitrate pentahydrate, manganese nitrate hexahydrate, and malic acid were mixed at a molar ratio of 1:1:6 in a mortar at a temperature of 25° C. for 15 minutes to obtain a material mixture for a combined metal oxide. Next, the obtained material mixture for a combined metal oxide was primarily calcined by heating at a temperature of 350° C. for 1 hour. Next, the product obtained by the primary calcination, water, and commercial water-dispersible zirconia sol as a binder were pulverized and mixed using a rotary ball mill at a rotation speed of 100 rotation/min for 5 hours such that a mass ratio thereof is 10:100:10 to obtain a precursor of a combined metal oxide. Next, the obtained precursor of the combined metal oxide was dried at a temperature of 120° C. for 12 hours and calcined at a temperature of 1000° C. for 1 hour to obtain a combined metal oxide represented by the chemical formula $YMnO_3$ and containing $ZrO_2$. Next, the obtained $YMnO_3$ containing $ZrO_2$ was reduction-treated at a temperature of 300° C.

Next, 80 parts by mass of the reduction-treated $YMnO_3$ containing $ZrO_2$, 10 parts by mass of Ketjen Black (manufactured by Lion Corporation) as a conductive material, 10 parts by mass of polyvinylidene fluoride (manufactured by Arkema K.K.) as a binding agent, and 80 parts by mass of lithium peroxide (manufactured by Kojundo Chemical Laboratory Co., Ltd.) as a lithium compound were dispersed in 600 parts by mass of N-methyl-2-pyrrolidone to be mixed. The obtained mixture was applied to the positive electrode current collector 9 made of an aluminum mesh (manufactured by Clever Co., Ltd.) and dried to form the positive electrode 2 having a diameter of 15 mm and a thickness of 0.5 mm.

Next, the lithium ion oxygen battery 1 shown in FIG. 1 was obtained in the same manner as in Example 3, except that the positive electrode 2 obtained in the present Example was used.

Figure 7:
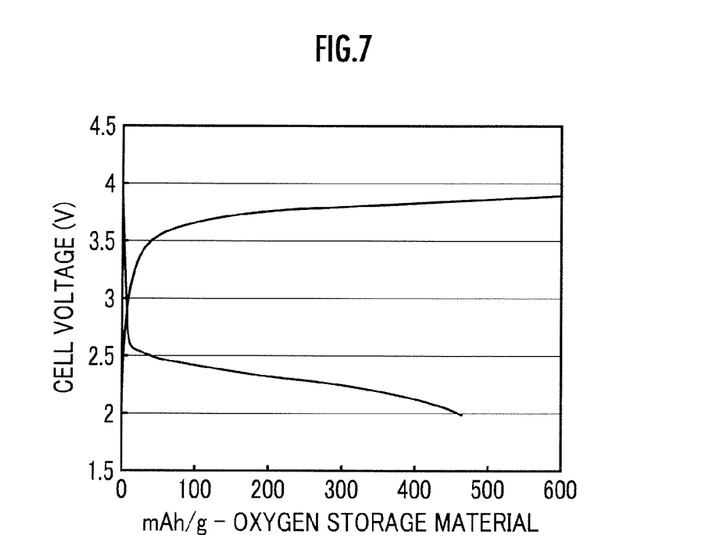
FIG. 7 is a graph showing charging and discharging curves in a lithium ion oxygen battery of Example 4.

Next, the lithium ion oxygen battery 1 obtained in the present Example was connected to an electrochemical measuring device (manufactured by Toho Technical Research Co., Ltd.), and a current of 0.0125 mA (0.022 mA) per 1 cm² of the negative electrode 3 was applied between the negative electrode 3 and the positive electrode 2 to be charged to 4.2 V or for 200 hours, and then, discharge was performed with a current of 0.025 mA (0.044 mA) per 1 cm² of the negative electrode 3 until a cell voltage reached 2 V. A relationship between the cell voltage and discharge capacity at this time is shown in FIG. 7.

Example 5

In the present Example, firstly, yttrium nitrate pentahydrate, silver nitrate, manganese nitrate hexahydrate, ruthenium nitrate, citric acid, and water were mixed at a molar ratio of 0.95:0.05:0.95:0.05:6:40 in a mortar at a temperature of 25° C. for 15 minutes to obtain a material mixture for a combined metal oxide. Next, the obtained material mixture for a combined metal oxide was primarily calcined by heating at a temperature of 350° C. for 1 hour. Next, the product obtained by the primary calcination was pulverized and mixed using a mortar, and calcined at a temperature of 1000° C. for 1 hour to obtain a combined metal oxide represented by a chemical formula $Y_{0.95}Ag_{0.05}Mn_{0.95}Ru_{0.05}O_3$. Next, the obtained $Y_{0.95}Ag_{0.05}Mn_{0.95}Ru_{0.05}O_3$ was reduction-treated at a temperature of 300° C.

Next, the lithium ion oxygen battery 1 shown in FIG. 1 was obtained in the same manner as in Example 4, except that the positive electrode 2 was formed by using the reduction-treated $Y_{0.95}Ag_{0.05}Mn_{0.95}Ru_{0.05}O_3$ obtained in the present Example in place of the reduction-treated $YMnO_3$ containing $ZrO_2$.

Figure 8:
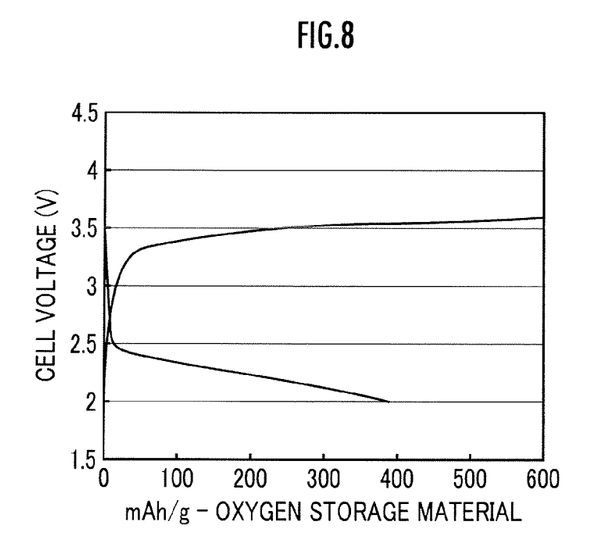
FIG. 8 is a graph showing charging and discharging curves in a lithium ion oxygen battery of Example 5.

Next, charge and discharge were performed in the same manner as in Example 4, except that the lithium ion oxygen battery 1 obtained in the present Example was used. A relationship between a cell voltage and discharge capacity at this time is shown in FIG. 8.

Example 6

In the present Example, firstly, the combined metal oxide represented by the chemical formula $Y_{0.95}Ag_{0.05}Mn_{0.95}Ru_{0.05}O_3$ was obtained in the same manner as in Example 5. Next, the obtained $Y_{0.95}Ag_{0.05}Mn_{0.95}Ru_{0.05}O_3$ was acid treated by being immersed in a nitric acid solution at a pH of 1 at a temperature of 25° C. for 12 hours, and furthermore, reduction-treated at a temperature of 300° C.

Next, the lithium ion oxygen battery 1 shown in FIG. 1 was obtained in the same manner as in Example 4, except that the positive electrode 2 was formed by using the acid-treated and reduction-treated $Y_{0.95}Ag_{0.05}Mn_{0.95}Ru_{0.05}O_3$ obtained in the present Example in place of the reduction-treated $YMnO_3$ containing $ZrO_2$.

Figure 9:
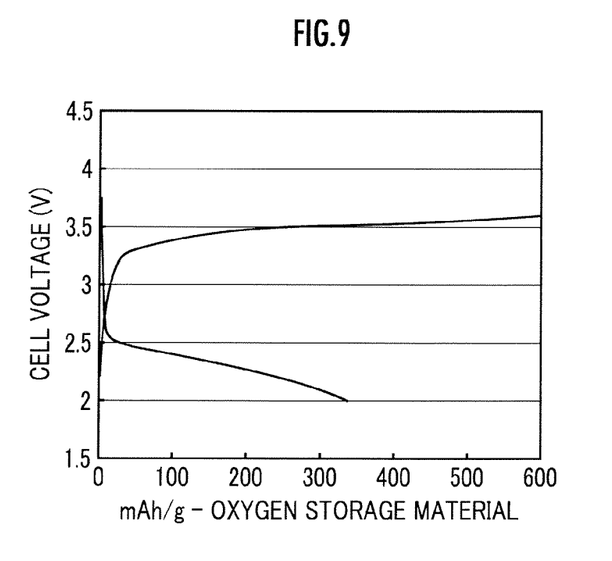
FIG. 9 is a graph showing charging and discharging curves in a lithium ion oxygen battery of Example 6.

Next, charge and discharge were performed in the same manner as in Example 4, except that the lithium ion oxygen battery 1 obtained in the present Example was used. A relationship between a cell voltage and discharge capacity at this time is shown in FIG. 9.

Example 7

In the present Example, firstly, yttrium nitrate pentahydrate, silver nitrate, manganese nitrate hexahydrate, titanium oxide, citric acid, and water were mixed at a molar ratio of 0.95:0.05:0.95:0.05:6:40 in a mortar at a temperature of 25° C. for 15 minutes to obtain a material mixture for a combined metal oxide. Next, the obtained material mixture for a combined metal oxide was primarily calcined by heating at a temperature of 350° C. for 1 hour. Next, the product obtained by the primary calcination was pulverized and mixed using a mortar, and calcined at a temperature of 800° C. for 1 hour to obtain a combined metal oxide represented by a chemical formula $Y_{0.95}Ag_{0.05}Mn_{0.95}Ti_{0.05}O_3$. Next, the obtained $Y_{0.95}Ag_{0.05}Mn_{0.95}Ti_{0.05}O_3$ was reduction-treated at a temperature of 300° C.

Next, the lithium ion oxygen battery 1 shown in FIG. 1 was obtained in the same manner as in Example 4, except that the positive electrode 2 was formed by using the reduction-treated $Y_{0.95}Ag_{0.05}Mn_{0.95}Ti_{0.05}O_3$ obtained in the present Example in place of the reduction-treated $YMnO_3$ containing $ZrO_2$.

Figure 10:
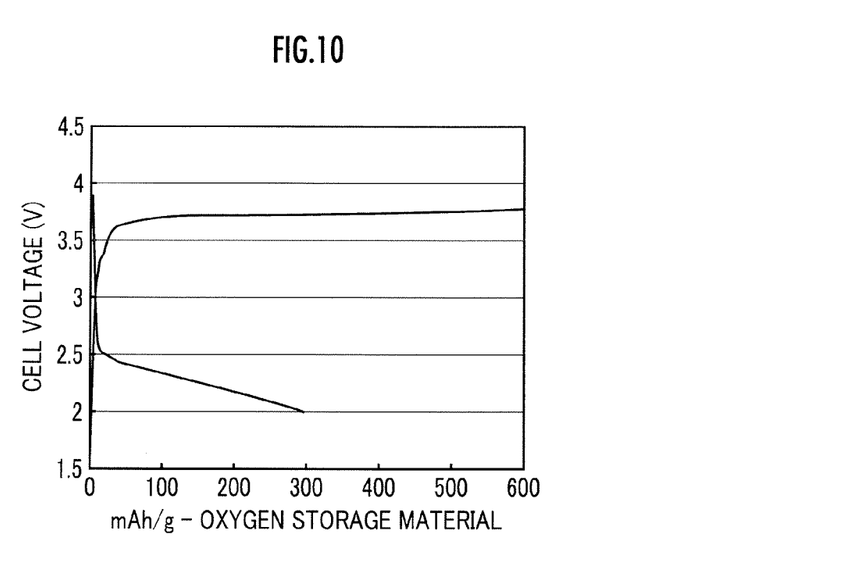
FIG. 10 is a graph showing charging and discharging curves in a lithium ion oxygen battery of Example 7.

Next, charge and discharge were performed in the same manner as in Example 4, except that the lithium ion oxygen battery 1 obtained in the present Example was used. A relationship between a cell voltage and discharge capacity at this time is shown in FIG. 10.

Example 8

In the present Example, firstly, zirconium oxynitrate, manganese nitrate hexahydrate, silver nitrate, ruthenium nitrate, citric acid, and water were mixed at a molar ratio of 0.02:1.88:0.05:0.05:6:40 in a mortar at a temperature of 25° C. for 15 minutes to obtain a material mixture for a combined metal oxide. Next, the obtained material mixture for a combined metal oxide was primarily calcined by heating at a temperature of 350° C. for 1 hour. Next, the product obtained by the primary calcination was pulverized and mixed using a mortar, and calcined at a temperature of 800° C. for 1 hour to obtain a combined metal oxide represented by a chemical formula $Zr_{0.02}Mn_{1.88}Ag_{0.05}Ru_{0.05}O_3$. Next, the obtained $Zr_{0.02}Mn_{1.88}Ag_{0.05}Ru_{0.05}O_3$ was reduction-treated at a temperature of 300° C.

Next, the lithium ion oxygen battery 1 shown in FIG. 1 was obtained in the same manner as in Example 4, except that the positive electrode 2 was formed by using the reduction-treated $Zr_{0.02}Mn_{1.88}Ag_{0.05}Ru_{0.05}O_3$ obtained in the present Example in place of the reduction-treated $YMnO_3$ containing $ZrO_2$.

Figure 11:
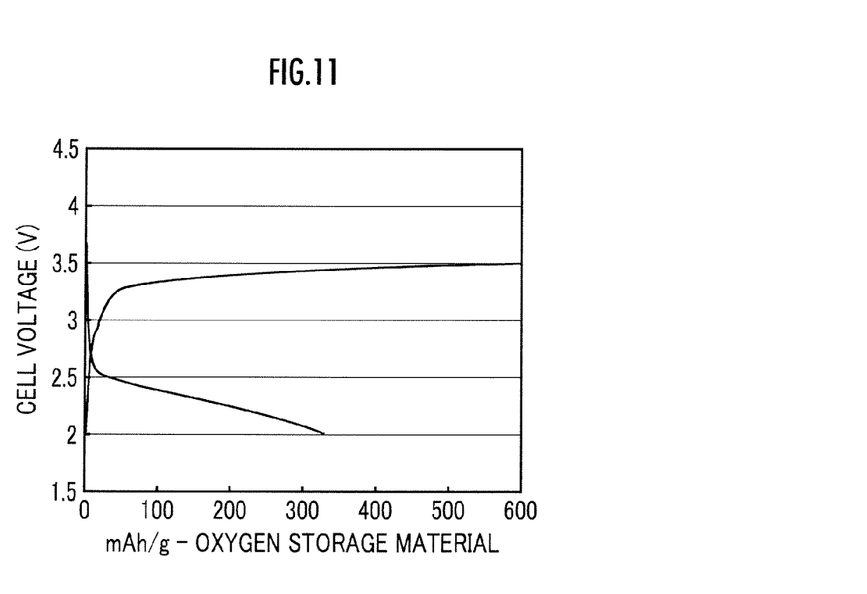
FIG. 11 is a graph showing charging and discharging curves in a lithium ion oxygen battery of Example 8.

Next, charge and discharge were performed in the same manner as in Example 4, except that the lithium ion oxygen battery 1 obtained in the present Example was used. A relationship between a cell voltage and discharge capacity at this time is shown in FIG. 11.

As shown in FIG. 6 to FIG. 11, the lithium ion oxygen battery 1 of Examples 3 to 8 can obtain excellent capacity compared to the lithium ion battery of Comparative Examples 1 and 2, in which the combined metal oxide used in Examples 3 to 8 and lithium peroxide are not contained at all in the positive electrode 2. Therefore, it is clear that, according to the lithium ion oxygen battery 1 of Examples 3 to 8, a high energy density can be achieved as is the case with the lithium ion oxygen battery 1 of Examples 1 and 2.

REFERENCE SIGNS LIST

1 . . . metal oxygen battery, 2 . . . positive electrode, 3 . . . negative electrode, 4 . . . electrolyte layer, 5 . . . case.

The invention claimed is:

1. A lithium ion oxygen battery comprising:
a positive electrode containing a lithium source, and an oxygen storage material; wherein the lithium source comprises a lithium compound except for a combined metal oxide of lithium and another metal;
a negative electrode made of a material capable of occluding or releasing lithium ions; and
an electrolyte layer sandwiched between the positive electrode and the negative electrode and capable of conducting the lithium ions, wherein
the positive electrode, the negative electrode, and the electrolyte layer are housed in a hermetic case,
the oxygen storage material occludes oxygen generated from the lithium compound when charging, adsorbs the oxygen on a surface thereof when charging, releases the occluded oxygen when discharging, and desorbs the adsorbed oxygen when discharging,
the oxygen storage material is any one of a combined metal oxide expressed by $YMnO_3$, heat-treated $YMnO_3$, $YMnO_3$ containing $ZrO_2$, a compound represented by a general formula $Y_{1-x}Ag_xMn_{1-y}A_yO_3$ where A represents Ru or Ti, 1>x>0 and 1>y>0, an acid-treated and heat-treated compound represented by a general formula $Y_{1-x}Ag_xMn_{1-y}A_yO_3$ where A represents Ru or Ti, 1>x>0 and 1>y>0), and a combined metal oxide represented by a general formula $Mn_{2-(a+b+c)}Zr_aAg_bRu_cO_3$ where 2>a+b+c>0 and each of a, b, and c is greater than 0, and
wherein in a state of being fully charged, the electrochemically active components of the positive electrode consist of the oxygen storage material and oxygen ions absorbed or bonded to the surface of the oxygen storage material.

2. The lithium ion oxygen battery according to claim 1, wherein
the material capable of occluding or releasing lithium ions is made of a carbonaceous material.

3. The lithium ion oxygen battery according to claim 2, wherein
the carbonaceous material is either graphite or hard carbon.

4. The lithium ion oxygen battery according to claim 1, further comprising a positive electrode current collector directly adjacent and in direct physical contact with a top end surface of the positive electrode and a negative electrode current collector directly adjacent and in direct physical contact with a bottom end surface of the negative electrode, wherein the electrolyte layer is sandwiched in close engagement between the positive electrode and the negative electrode, a top surface of the positive electrode current collector is directly adjacent and in direct physical contact with a top wall of the hermetic case, a bottom surface of the negative electrode current collector is directly adjacent and in direct physical contact with a bottom wall of the hermetic case, and circumferential faces of the positive electrode current collector, the positive electrode, the electrolyte layer, the negative electrode, and the negative electrode current collector are directly adjacent and in direct physical contact with inner circumferential walls of the case such that the positive electrode, the negative electrode, and the electrolyte layer substantially fully occupy the interior of the hermetic case.

* * * * *